Figure 1:
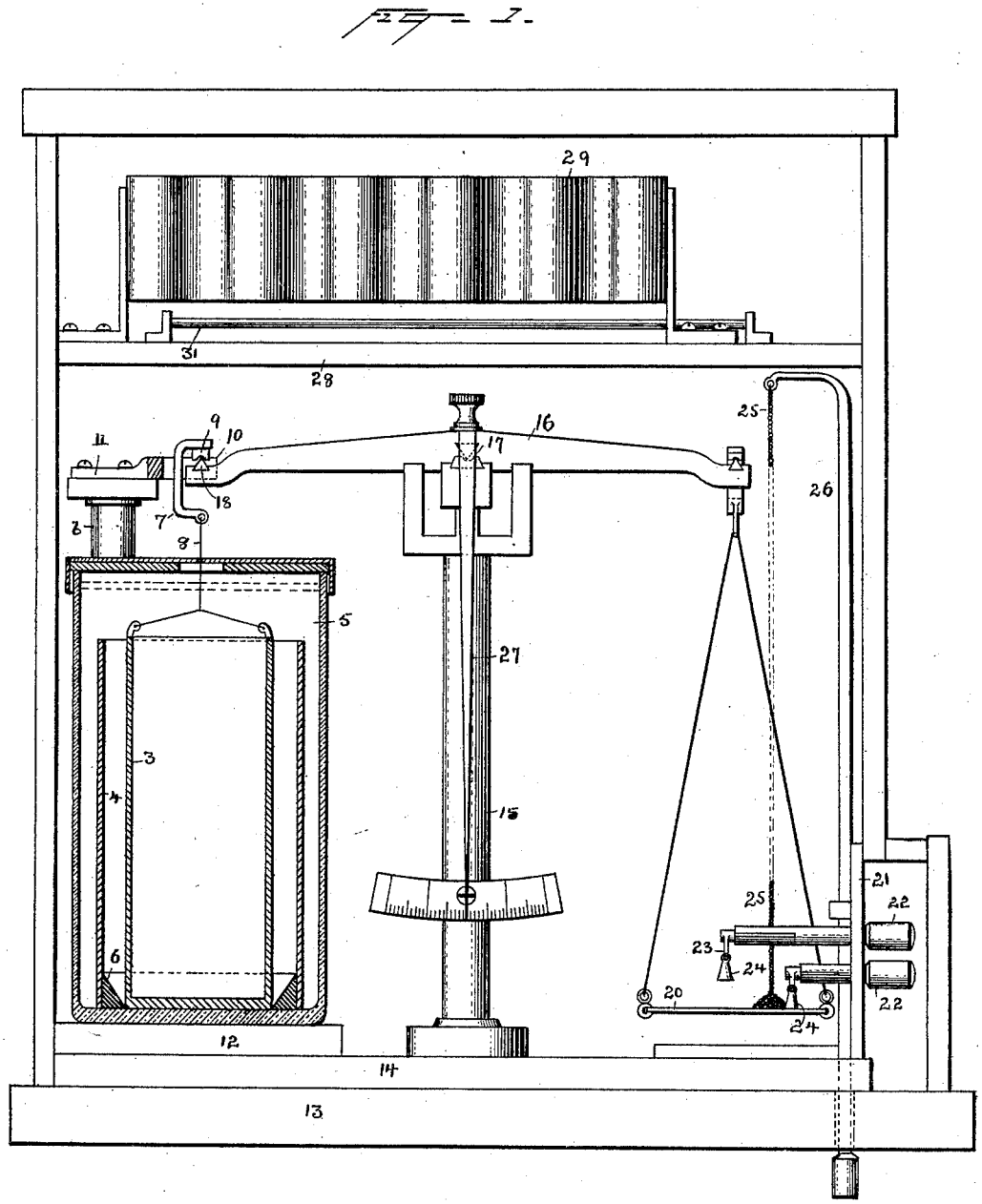

(No Model.)

3 Sheets—Sheet 1.

T. A. EDISON.
ELECTRIC METER.

No. 476,990. Patented June 14, 1892.

Witnesses
Norris A. Clark.
N. F. Oberlin

Inventor
T. A. Edison,
By his Attorneys
Dyer & Seely.

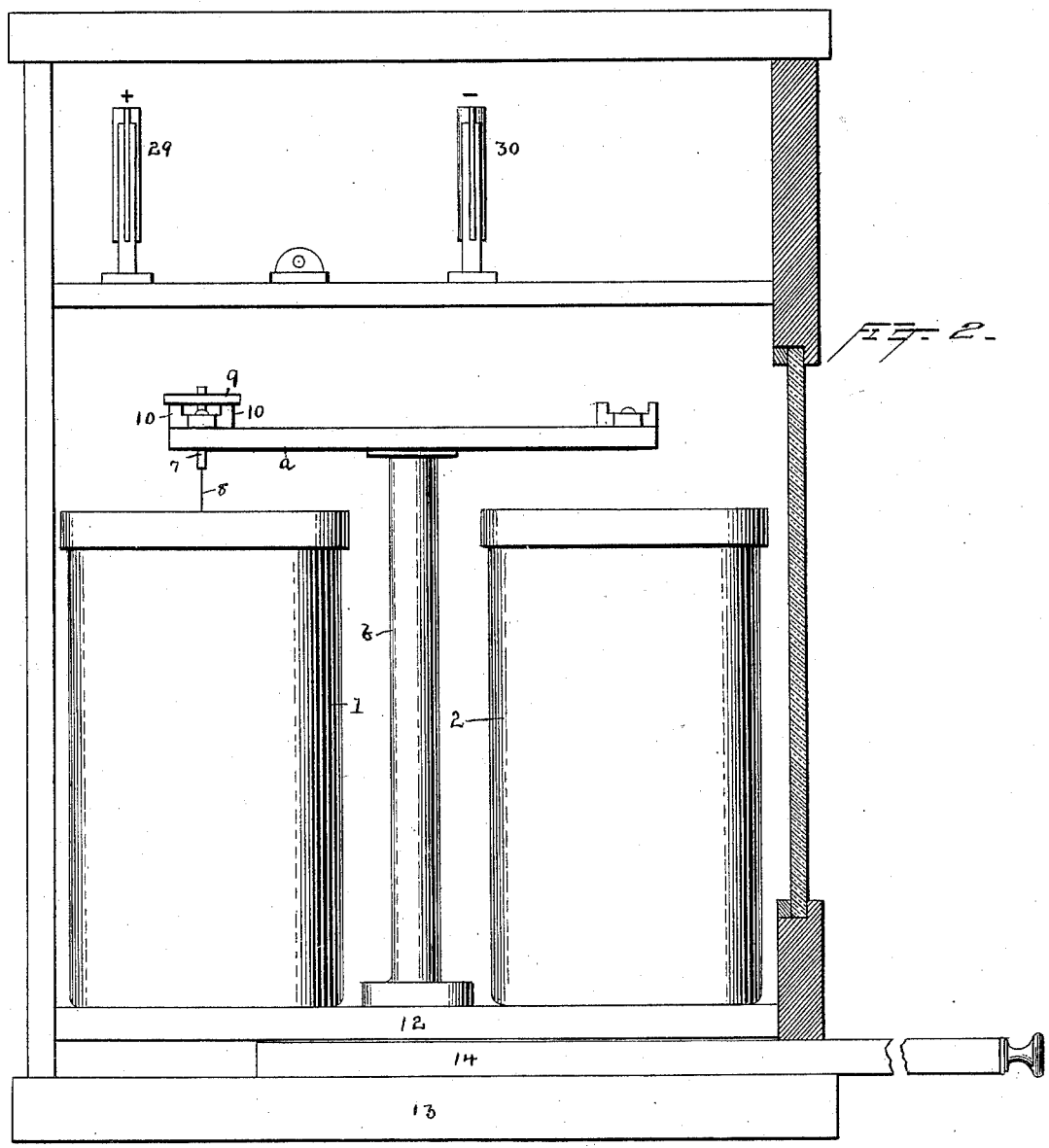

(No Model.) 3 Sheets—Sheet 3.
T. A. EDISON.
ELECTRIC METER.
No. 476,990. Patented June 14, 1892.
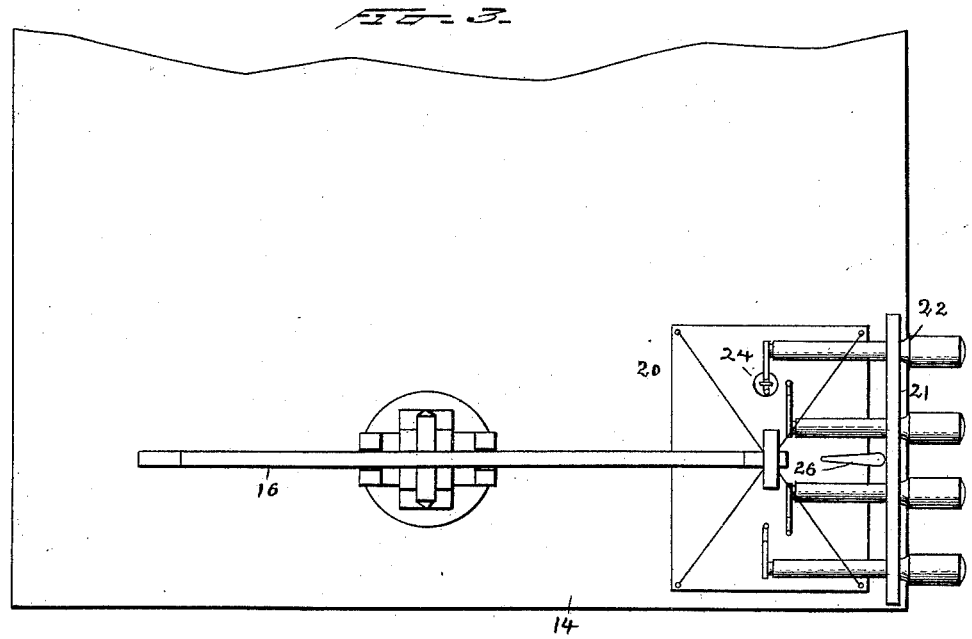
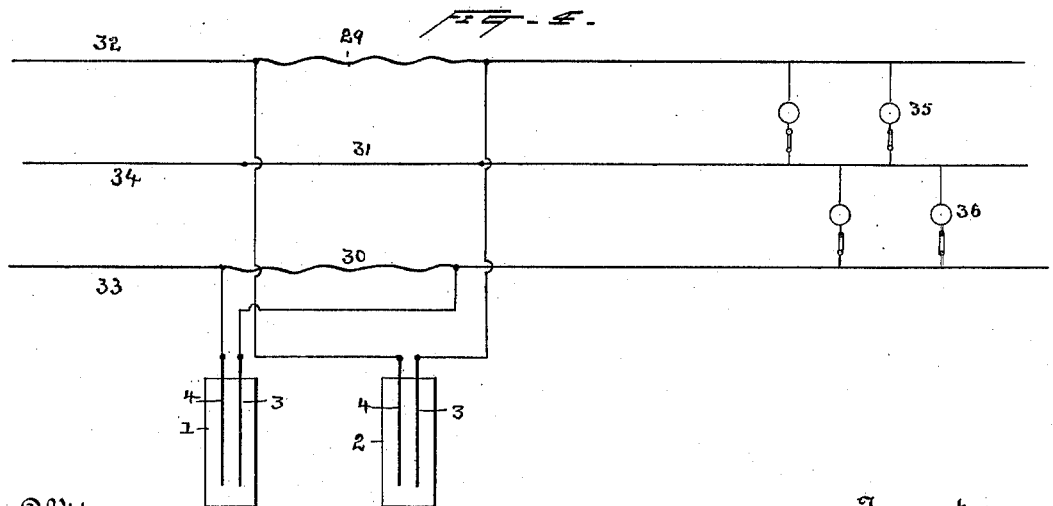
Witnesses
Norris G. Clark.
N. F. Oberlin
Inventor
T. A. Edison
By his Attorneys
Dyer & Seely.

UNITED STATES PATENT OFFICE.

THOMAS A. EDISON, OF LLEWELLYN PARK, NEW JERSEY.

ELECTRIC METER.

SPECIFICATION forming part of Letters Patent No. 476,990, dated June 14, 1892.

Application filed August 25, 1891. Serial No. 403,669. (No model.)

*To all whom it may concern:*

Be it known that I, THOMAS A. EDISON, a citizen of the United States, residing at Llewellyn Park, in the county of Essex and State of New Jersey, have invented a certain new and useful Improvement in Electric Meters, (Case No. 927,) of which the following is a specification.

The present invention relates to devices for measuring electric currents and is of the class in which the current used is measured by the amount of metal deposited in a suitable cell by a definite fraction of the current used on the line; and the invention consists in the improved means for weighing such deposited metal, and more especially in means for weighing the deposited metal in a double meter used in connection with a three-wire distributing system; and the invention consists, also, in the several features and combinations hereinafter set forth and claimed.

In the accompanying drawings, Figure 1 is a sectional view of the meter, taken through one of the depositing-cells. Fig. 2 is a view at right angles to Fig. 1, the section being taken on the line $x\ x$. Fig. 3 is a plan of a portion of the weighing apparatus, and Fig. 4 is a diagram illustrating the circuit connections of the meter.

1 2 are glass cells containing the zinc or other metal electrodes 3 4, immersed in zinc sulphate or other suitable solution 5. These cells are preferably considerably larger than have heretofore been used, so that the resistance of the circuit within the cell is decreased. This diminishes error in the meter.

6 is a beveled insulating-ring, which serves to hold the electrodes in proper relative position. The central electrode, which is the cathode, is connected to the suspending hook 7 by a wire 8, which is very fine—say one-fiftieth of an inch—and which passes through a perforation in the cover of the cell. The hook 7 is provided with a cross-piece 9, which rests on the two arms 10 10 of the block 11.

The cells 1 2 stand on a stationary shelf 12, placed a little distance above the bottom 13 of the case of the meter. Between the shelf 12 and the bottom 13 is a sliding plate 14, on which is the supporting-standard 15 of the weighing apparatus.

16 is the balance or scale-beam, pivoted at 17 and having at 18 a knife-edge, adapted to co-operate with the block 9 at the end of the hook 7, as indicated in Fig. 1. At the opposite end of the beam is carried a scale-pan 20. At the front of the board or plate 14 and movable with it is a vertical strip 21, through which passes several rods or handles 22. I prefer to use two rows of handles with four in each row, although only two are shown in each row in the drawings. At the inner ends of these handles are hooks 23, carrying weights 24. The handles fit tightly in the holes, through which they pass with sufficient friction to hold the weights from the pan when they have been raised manually. When it is desired to place any weight on the pan, the handle which supports the weight of desired denomination is turned until the weight rests on the pan and the hook 23 does not support it. The weights will generally vary from one to fifty grams.

To weigh fractions of a gram, I employ a chain 25 of definite weight for each unit of length. This chain is supported by a sliding rod 26, which passes through the bottom of the meter and through the board 14, a slot being provided in the bottom 13, as indicated in dotted lines, so that the handle can slide along with the plate 14.

27 is an index or pointer moved by the scale-beam over a suitable scale.

Above the weighing apparatus is a partition 28, on which are supported two resistance-conductors 29 30, preferably in the form of German-silver foil, and a third conductor, preferably a copper rod 31.

The circuit connections will be clear from Fig. 4. 32 is the positive, and 33 the negative, lead of the system, and 34 is the third or neutral wire. From the terminals of the two resistances 29 30 wires extend to the electrodes of the two depositing-cells, as shown.

When the circuit is closed to any of the translating devices 35 or 36, the main portion of the current will pass directly through the main circuit; but a portion will be diverted through the depositing-cells, owing to the resistance of the German-silver foil and metal will be deposited upon the cathode. The amount of current, and hence the amount of metal deposit, will depend on the number of translating devices in circuit. Suppose that all of the translating devices 35 are in circuit and that all of the translating devices 36 are out of circuit. All of the current on the line will then pass through wire 32, through the translating devices and by the neutral wire 34 back to the generator, and metal will be deposited in the section of the meter at the right and none in the section at the left. When, however, the circuit is closed through any of the translating devices 36, current (the amount depending on the number of translating devices thrown into circuit) returns to the generating-station by wire 33, as is well understood by those familiar with the three-wire system. Hence metal will be deposited in the meter-section at the left, the amount depending on the number of translating devices in circuit.

When it is desired to weigh the deposited metal, the plate 14 is slid along until the knife-edge 18 of the scale-beam rests immediately under one of the blocks 9. Weights are then lowered onto the scale-pan by turning the handles 22 until the cathode is very nearly counterbalanced, and then to more accurately balance the same the rod 26 is pulled down, allowing the chain to rest on the pan. The length of the chain which rests on the pan will be indicated by the distance which the rod 26 projects below the bottom 13. To weigh the cathode in the other cell it is only necessary to tilt the scale-beam slightly, allowing the cross-arm 9 to rest on the arms 10, and then to slide the plate 14 and the entire weighing apparatus along until the beam comes into a corresponding position to that shown in Fig. 1 in relation to the second cell. With this arrangement a single weighing apparatus, constituting a part of the meter mechanism, may be used for determining the weight of metal deposited in several cells.

The plates are weighed at the meter where the customer can see the same, and the weighing is done with the same scales each month and by scales which have been continuously in the custody of the consumer. This insures him that the weighing is correct. It also saves labor in transportation to the central station of the electrodes to be weighed for the owner of the meter.

What I claim is—

1. The combination, with a meter in which current is measured by the weight of metal deposited and having more than one depositing-cell, of a single weighing apparatus forming a part of the meter and common to all of the cells and in position or adapted to be moved into position to weigh the cathodes without removing them from their cells, substantially as described.

2. The combination, with the depositing-cells of an electrical meter having more than one cell, of a weighing apparatus forming a part of the meter and movable into position to weigh an electrode of either cell at will, substantially as described.

3. The combination, with the depositing-cells of an electrical meter having more than one cell, of a weighing apparatus forming a part of the meter and a sliding supporting-plate for the same movable to bring the weighing apparatus into position to co-operate with either cell at will, substantially as described.

4. The combination, with the depositing-cells of an electrical meter having more than one cell, of a weighing apparatus forming a part of the meter and movable into position to weigh an electrode of either cell at will, said weighing apparatus having a balanced lever or scale-beam, one end of which is adapted to support the electrode to be weighed and the other end of which carries a suitable pan, and movable handles supporting weights in such position as to be placed on the pan by movement of the handles, substantially as described.

5. The combination, with the depositing-cells of an electrical meter having more than one cell, of a weighing apparatus forming a part of the meter and movable into position to weigh an electrode of either cell at will, said weighing apparatus having a balanced lever or scale-beam, one end of which is adapted to support the electrode to be weighed and the other end of which carries a suitable pan, and movable handles having hooks supporting weights in such position as to be placed on the pan by movement of the handles, substantially as described.

6. The combination, in a meter, of depositing-cells, the suspending devices for electrodes thereof and the movable weighing apparatus adapted to be engaged with either suspending device at will, substantially as described.

7. The combination, with the depositing-cell of an electrical meter, of a weighing apparatus forming a part of the meter and in position to weigh an electrode of the cell, said weighing apparatus having a balanced lever or scale-beam, one end of which is adapted to support the electrode to be weighed and the other end of which carries a suitable pan, a chain of definite weight per unit of length, and means for placing any desired length of the chain on the pan, substantially as described.

8. The combination, with the depositing-cell of an electrical meter, of a weighing apparatus forming a part of the meter and in position to weigh an electrode of the cell, said weighing apparatus having a balanced lever or scale-beam, one end of which is adapted to support the electrode to be weighed and the other end of which carries a suitable pan, handles carrying weights and adapted to move the same onto or off from the pan, a chain of definite weight per unit of length, and means for placing any desired length of the chain on the pan, substantially as described.

9. The combination, with the depositing-cell of an electrical meter, of an inclosing case therefor, a weighing apparatus also in said inclosing case and adapted to engage the cathode to weigh it without removing it from its cell, substantially as described.

This specification signed and witnessed this 31st day of July, 1891.

THOS. A. EDISON.

Witnesses:
JOHN F. RANDOLPH,
FREDERICH OTT.